(12) United States Patent
Pervaiz

(10) Patent No.: US 7,400,952 B2
(45) Date of Patent: Jul. 15, 2008

(54) METHOD AND APPARATUS FOR CONTROLLING DESICCANT REGENERATION IN AIR DRYER EQUIPMENT FOR A LOCOMOTIVE

(75) Inventor: Muhammad Pervaiz, Erie, PA (US)

(73) Assignee: General Electric Company, Schenectady, NY (US)

( * ) Notice: Subject to any disclaimer, the term of this patent is extended or adjusted under 35 U.S.C. 154(b) by 480 days.

(21) Appl. No.: 11/139,844

(22) Filed: May 27, 2005

(65) Prior Publication Data
US 2005/0283282 A1    Dec. 22, 2005

Related U.S. Application Data

(60) Provisional application No. 60/581,063, filed on Jun. 18, 2004.

(51) Int. Cl.
*G06F 17/00* (2006.01)
(52) U.S. Cl. .......................................... 701/19; 701/20
(58) Field of Classification Search ............. 701/19–20; 34/282; 246/1 R; 96/143; 303/53–54
See application file for complete search history.

(56) References Cited

U.S. PATENT DOCUMENTS

| | | | |
|---|---|---|---|
| 5,514,035 A * | 5/1996 | Denniston .................. 454/121 |
| 5,715,621 A | 2/1998 | Mitsch | |
| 5,873,256 A * | 2/1999 | Denniston ....................... 62/91 |
| 5,983,516 A | 11/1999 | Trapp et al. | |
| 6,042,197 A | 3/2000 | Zoerner et al. | |
| 6,077,330 A | 6/2000 | Sabelstrom | |
| 6,092,375 A * | 7/2000 | Denniston ....................... 62/94 |
| 6,128,825 A | 10/2000 | Cunkelman | |
| 6,481,222 B1 * | 11/2002 | Denniston ....................... 62/94 |
| 6,581,297 B1 | 6/2003 | Ginder | |
| 6,719,825 B2 | 4/2004 | Wedge et al. | |
| 2004/0040172 A1 | 3/2004 | Crawford | |
| 2004/0173095 A1 | 9/2004 | Vierling | |

* cited by examiner

*Primary Examiner*—Yonel Beaulieu
(74) *Attorney, Agent, or Firm*—John Kramer, Esq.; Enrique J. Mora, Esq.; Beusse Wolter Sanks Mora & Maire. P.A.

(57) ABSTRACT

Method, apparatus and computer program product are provided for controlling desiccant regeneration in air dryer equipment for a railroad locomotive. The method allows calculating an amount of air conditioned by the air dryer equipment over a period of time. The method further allows storing predefined criteria for initiating desiccant regeneration in the air dryer equipment. The calculated amount of air conditioned by the air dryer equipment is correlated relative to the predefined criteria, and upon the calculated amount of air conditioned by the air dryer equipment meeting the predefined criteria, desiccant regeneration is initiated in the air dryer equipment.

21 Claims, 5 Drawing Sheets

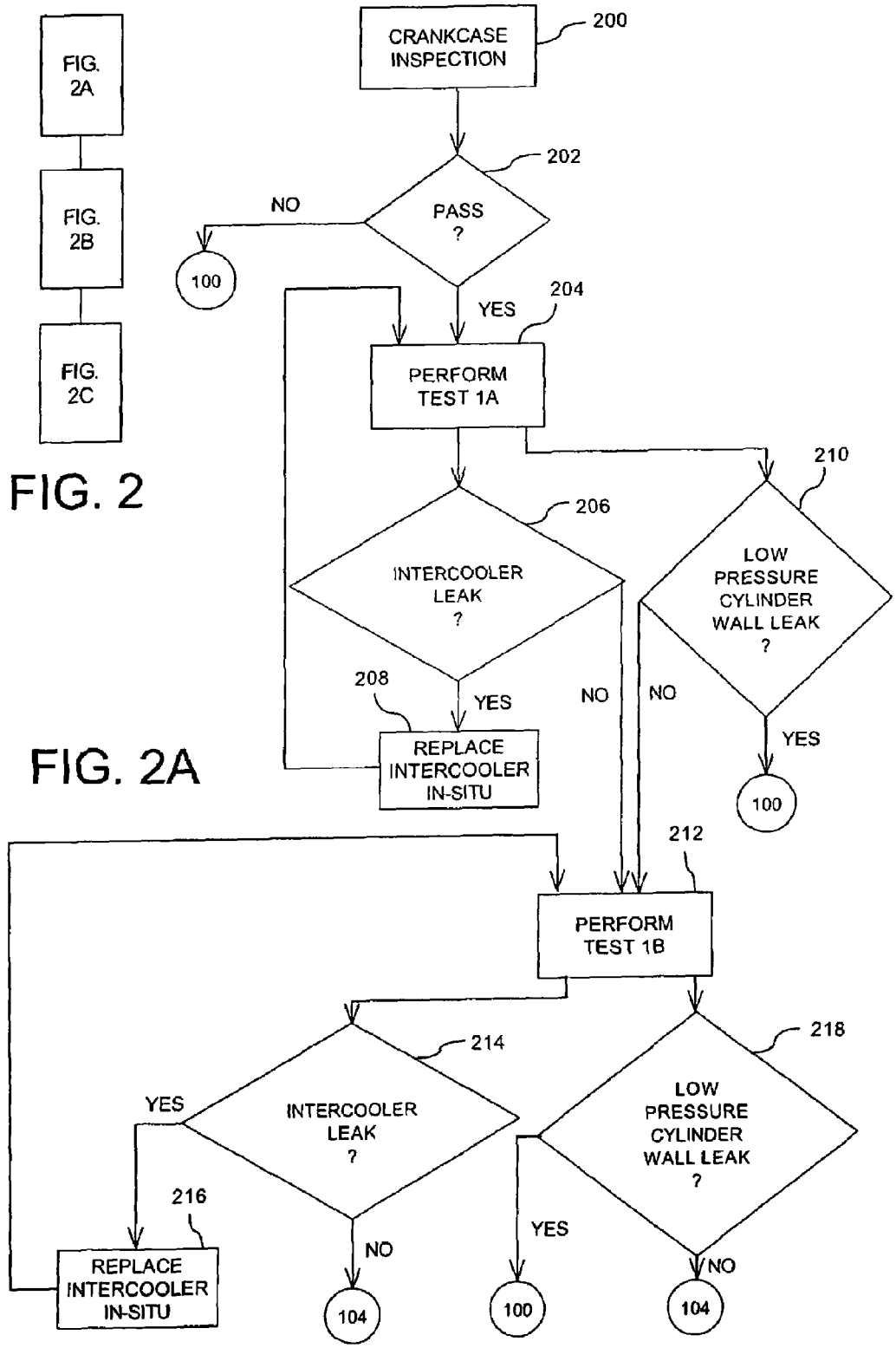

US 7,400,952 B2

METHOD AND APPARATUS FOR CONTROLLING DESICCANT REGENERATION IN AIR DRYER EQUIPMENT FOR A LOCOMOTIVE

This application claims the benefit of U.S. application Ser. No. 60/581,063 filed Jun. 18, 2004, which is hereby incorporated by reference in its entirety.

BACKGROUND OF THE INVENTION

It is known to use multi-cylinder air compressors on freight and passenger locomotives to supply compressed air to various locomotive systems, such as the operating and control equipment of a railway air brake system. Prior art techniques for servicing the air compressor system have essentially required uninstalling and shipping major components of the air compressor system, such as the entire compressor, to a specialized compressor servicing site. This approach may lead to unnecessary costs and delays, if the type of component causing the malfunction was one that could be replaced in-situ at the locomotive (i.e., as installed onboard the locomotive) without having to incur the delays and expenses associated with shipping the entire compressor to the specialized servicing site. However, heretofore there was no effective procedure or test apparatus to diagnose locomotive air compressors in-situ to determine if the malfunction was due to an in-situ serviceable component or to a cause that required removal of the air compressor system and servicing off-board of the locomotive.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

The inventor of the present invention has innovatively recognized a sequence of diagnostics techniques that may be performed in-situ onboard a locomotive for identifying in a locomotive air compressor system (out of various components that make up such a system) a specific malfunctioning component that is likely to require a servicing action and further identifying a type of servicing action appropriate for correcting the malfunction. This type of technique is particularly advantageous in the locomotive industry since now one may be able to replace certain identified components in-situ on the locomotive while at a generic or non-specialized locomotive service shop without having to uninstall and ship main components of the compressor system for servicing at a specialized suppliers site. This is a significant improvement over prior art techniques that have essentially required uninstalling and shipping major components of the air compressor system, such as the compressor, regardless of whether in fact there is ultimately determined to be a need for such specialized servicing. For example, a cylinder head including intake and outlet valves could be replaced at the generic service shop without having to uninstall and ship the entire compressor to the specialized suppliers site. Below is a description of an exemplary compressor air system that may benefit from the diagnostics techniques embodying aspects of the present invention.

Figure 1:
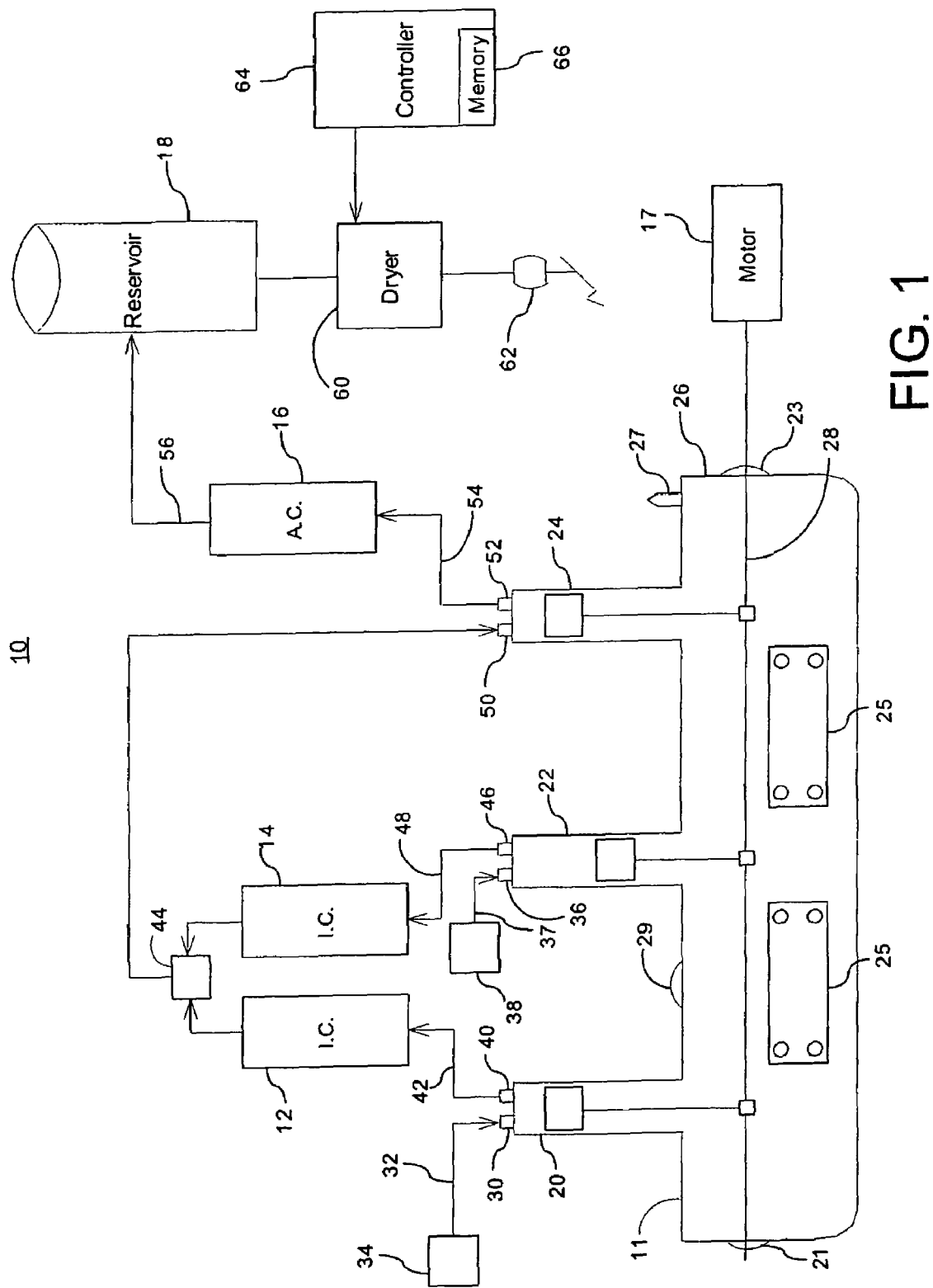
FIG. 1 illustrates a schematic representation of an exemplary locomotive air compressor system that benefits from aspects of the present invention.

FIG. 1 shows an air compressor system 10, including a pair of intercoolers 12 and 14, an aftercooler 16, a main storage reservoir 18, and associated piping. In one exemplary embodiment air compressor system 10 comprises a multi-cylinder, two-stage, air-cooled compressor having a first low pressure cylinder 20 and a second low pressure cylinder 22 and a high pressure cylinder 24, each of which may be provided with cooling fins. As shown, the pair of low pressure cylinders 20 and 22 and the high pressure cylinder 24 may be mounted on and supported by a crankcase 26 in the usual manner and include respective pistons which are actuated by connecting rods driven by a rotatable crankshaft 28. In one exemplary embodiment the crankcase 26 includes a breather valve 27 and an oil-fill plug 29. One end of the crankshaft 28 may be coupled to and driven by a suitable rotatable prime mover, such as an electric motor 17 or the like, while the other end of the crankshaft 28 may be attached to a rotary cooling fan assembly (not shown). Crankcase seals 21 and 23 are commonly employed to seal both ends of the crankshaft 28 to prevent leakage of lubricating fluid. One or more side removable covers 25 may be provided to provide access to the interior of the crankcase 26.

An inlet valve 30 of the low-pressure cylinder 20 is connected by conduit 32 to an intake filter 34, while an inlet valve 36 of the low-pressure cylinder 22 is connected by conduit 37 to an air intake filter 38. An outlet valve 40 of the low-pressure cylinder 20 is connected to an inlet header of the first intercooler 12 via a pipe 42. It will be appreciated that although FIG. 1 illustrates just one inlet and outlet valve per cylinder head assembly, in one exemplary embodiment, each cylinder head assembly may comprise a pair of inlet and outlet valves per cylinder head. Typically, the valves may be spring-loaded valves responsive to negative or positive pressure to reach either a closed or an open condition.

An outlet header of intercooler 12 is connected to one inlet of a T-pipe fitting 44. Similarly, an outlet valve 46 of the low pressure cylinder 22 is connected to an inlet header of the second intercooler 14 via a pipe 48. An outlet header of intercooler 14 is connected to the other inlet of the T-pipe fitting 44, while the outlet of the T-pipe fitting 44 is connected to an inlet valve 50 of the high pressure cylinder 24. An outlet valve 52 of high pressure cylinder 24 is connected by suitable conduits and fittings forming piping 54 to an inlet header of the aftercooler 16. An outlet header of aftercooler 16 is connected by suitable conduits and fittings forming piping 56 to the inlet of the main storage reservoir 18.

Below is a description of an exemplary sequence of tests for identifying in a locomotive air compressor system any of various components that are likely to require a servicing action that, for example may performed in-situ onboard the locomotive or at an specialized compressor servicing site based on the results of the performed test sequence.

Crankcase Inspection Test:

Evacuate oil from crankcase and then remove side covers 25 and inspect the interior of the crankcase 26, e.g., bearings and lubrication system. For example, if one detects the presence of pieces of metal, or bad bearings, then a servicing decision would be to remove the compressor for an overhaul. If this upfront test is passed, one would reattach the side covers 25 and continue with the tests below.

Intercoolers and Low Pressure Cylinder Tests:

Test 1A (Pressurizing Intercoolers and One of the Two Low Pressure Cylinders):
1. Remove air filters 34 and 38.
2. Remove oil-fill plug 29
3. Block breather valve 27
4. Block one of the intake conduits (e.g., the conduit 32 that provides an intake to one of the low pressure cylinders, e.g., low pressure cylinder 20).
5. Block the pipe that provides a discharge outlet to the aftercooler 16. That is, block pipe 56.
6. Install on the other intake conduit (e.g., conduit 37 that provides an intake to low pressure cylinder 22), a pressurizing fixture (e.g., including a pressure gage and valve).
7. Pressurize to a predefined pressure (e.g., 60 psi) and start to measure time, e.g., start a timer.
8. Record time elapsed upon reaching one or more predefined pressure levels, e.g., 55, 50, 45 and 40 psi pressure.
9. Compare the actual elapsed time recorded at the predefined pressure levels relative to predefined threshold times.
10. Check for possible air leak through intercoolers 12 and 14, e.g., visual check.
11. Check for possible airflow through oil-fill opening 29.

The predefined pressure (e.g., 60 psi) applied in step 6 above is sufficiently high to cause intake valve 36 to open and pressurize the low-pressure cylinder 22 as well as intercoolers 12 and 14. The predefined pressure is also sufficiently low to stay within the pressure ratings of the intercoolers 12 and 14 and avoid actuating the intake valve 50 of the high-pressure cylinder 22 to an open condition. At this point, presuming the outlet valve 40 is operating properly, the head of the low-pressure cylinder 20 has not been pressurized because the outlet valve 40 is in a closed condition in response to the applied pressure. Thus, one would perform another sequence of steps for pressurizing the head of the low-pressure cylinder 20. More specifically, Test 1B (Pressurizing Intercoolers and the Other One of Low Pressure Cylinders):
1. Block the other one of the intake conduits (e.g., conduit 37) that provides an intake to low-pressure cylinder 22).
2. Install on the other intake conduit (e.g., conduit 32 that provides an intake to low pressure cylinder 20), the pressurizing fixture
3. Pressurize to the predefined pressure (e.g., 60 psi) and start to measure time, e.g., start a timer.
4. Record time elapsed time upon reaching one or more predefined pressure levels, e.g., 55, 50, 45 and 40 psi pressure.
5. Compare the actual elapsed time recorded at the predefined pressure levels relative to predefined threshold times.
6. Check for possible air leak through intercooler 12 and 14, e.g., visual check
7. Check for possible airflow through oil-fill opening.

The foregoing sequence is essentially arranged for determining whether there is a leak in any (or both) of the intercoolers 12 and 14 and whether there is a leak in any of the low-pressure cylinder heads, such as air leaking by the piston rings of any of the low-pressure cylinder heads and into the crankcase. The inventor of the present invention has identified failure mode indications associated with respective components of the compressor system that may be observed during the test sequence. One key advantage of the present invention over prior art techniques is being able to accurately distinguish and identify the type of failure modes that may be corrected in-situ from those that will require removal of major equipment from the locomotive for servicing at the specialized servicing site. Occurrence of specific indications would point out to a likely malfunction in a given component. For example, intercooler leaks may be generally characterized as relatively slow leaks compared to a low-pressure cylinder wall leak. The presence of intercooler leaks may be determined by visual inspection and/or a relatively moderate depressurizing rate (e.g., if the elapsed time to reach 40 psi is approximately 15 seconds, this may be indicative of an intercooler leak). Intercooler leaks tend to be visually detectable since intercoolers that have been in operational use for some time tend to collect visually detectable debris in their interior.

In the event of a low-pressure cylinder wall leak, e.g., air passes into the crankcase from a respective one of the low-pressure cylinder heads, then one may be able to detect airflow through the oil-fill opening. This detection may be accomplished by monitoring the condition of a tape or other suitable thin flexible member placed over the oil-fill opening. In addition, service personnel may feel or hear such airflow. Moreover, a low-pressure cylinder wall leak tends to exhibit a higher depressurizing rate as compared to an intercooler leak. For example, while an intercooler leak may take about 15 seconds to reach 40 psi, a low-pressure cylinder wall leak may take just 5 seconds or less to reach 40 psi. The ability to determine the presence of an intercooler failure versus a cylinder wall failure is significant since the intercoolers may be readily replaced at the locomotive without having to remove the entire compressor whereas a cylinder leak into the crankcase typically requires removal of the entire compressor for an appropriate overhaul at a specialized service site.

It has been observed from test data that variation in the recorded elapsed times (indicative of different depressurizing rates) obtained during Tests 1A and 1B tend to indicate that the intercoolers 12 and 14 are functioning properly and that the cause of this variation is likely to be caused by some other malfunctioning component, but not the intercoolers. This follows since during Tests 1A and 1B both intercoolers represent an assembly tested in common during each test and thus variations that may arise in the recorded elapsed times would tend to point to a different failure mode, such as leakage in one of the low-pressure cylinder walls.

Test 2—Aftercooler and High Pressure Cylinder Tests:
1. Open intake conduits to low-pressure cylinders 20 and 22.
2. Install pressurizing fixture at aftercooler discharge outlet. That is, pipe 56.
3. Pressurize to a predefined pressure, e.g., 80 psi and start to measure time, e.g., start a timer.
4. Record time elapsed upon reaching one or more predefined pressure levels, e.g., at 75, 70, 65 and 60 psi.
5. Compare the actual elapsed time recorded at the predefined pressure levels relative to predefined threshold times.
6. Check for possible air leak through aftercooler 16, e.g., visual check
7. Check for possible airflow through oil-fill opening.

One aspect of this test allows pressurizing the aftercooler 16 and determining the presence of a leak in the aftercooler. The presence of such a leak may be determined by visual inspection and/or a relatively moderate depressurizing rate (e.g., if the elapsed time to reach 60 psi is approximately 15 seconds, this may be indicative of an aftercooler leak. Another aspect of this test also allows determining a malfunction in the outlet valve 52 of the high-pressure cylinder 24. For example, if the outlet valve 52 is operating properly, then when the aftercooler 16 is pressurized through pipe 56, that valve should remain closed and the pressurization should be limited to the aftercooler 16. In the event of a leaky outlet valve 52 in the high-pressure cylinder, the head of the high-pressure cylinder will also become pressurized. Test data reveals that once a leaky valve has been found in a given cylinder head, there tends to be a likelihood that the remaining valves associated with that cylinder head will also require replacement. Thus, assuming the outlet valve 52 of the high-pressure cylinder is found to be leaky, one would replace the cylinder head for that cylinder. This is a relatively straightforward servicing operation that may be performed without removing the entire compressor from the locomotive. As described in the context of Tests 1A and 1B, monitoring whether there is airflow through the oil-fill port may point to a leak in the high-pressure cylinder head, such as air leaking by the respective high-pressure piston rings and into the crankcase. Once again being able to determine different failure modes is significant since different course of actions will be taken depending on the specific malfunction or failure mode that has been identified. For example, replacement of the aftercooler 16 and/or the high-pressure cylinder head including the respective intake and outlet valves 50 and 52 may be performed at the locomotive whereas a cylinder leak into the crankcase will require removal and shipping of the compressor for overhaul at a specialized compressor service site.

Test 3—(Crankcase Pressure Test):
1. Remove test fixture from aftercooler discharge outlet.
2. Install pressurizing fixture at oil fill port.
3. Pressurize to a predefined pressure, e.g., 10 psi, and start to measure time, e.g., start a timer.
4. Compare the actual elapsed time recorded at the predefined pressure levels relative to one or more predefined threshold times, e.g., at 9, 8, 7, 6, 5, 4, 3 and 2 psi pressure.

This test primarily allows determining the health of the crankcase seals 21 and 23. In one exemplary embodiment, with the motor 17 installed, physical access to the end of the crankshaft where seal 23 is situated is not realizable. Thus, by pressurizing the crankcase and monitoring a depressurization rate and comparing to a predefined threshold, (e.g., if the elapsed time to reach 2 psi is approximately 60 seconds), one may obtain an indication of crankcase seal health without having to remove the compressor motor.

Referring back to FIG. 1, air dryer equipment 60 may be connected to remove moisture and/or other particulates, such as oil particulates, that may be present in the compressed air to avoid condensation and/or contamination on the surfaces of one or more locomotive equipment (not shown) situated downstream that receive the pressurized air. In one known exemplary embodiment, the dryer equipment may comprise adsorbent-type air dryer that uses a regenerative desiccant that adsorbs moisture, at least up to a certain level of adsorption capacity. The moisture accumulated by the desiccant is then removed via a stream of dried air redirected through the desiccant to purge the moisture into the atmosphere. In one known technique, the air dryer equipment is responsive to a timer signal so that the regeneration process is performed at a fixed interval, (e.g., approximately every 2 minutes) regardless of actual usage of compressed air by the equipment downstream. This known technique forces the air compressor system to turn on and off based on the fixed timing for regeneration regardless of the actual consumption of compressed air by the locomotive equipment downstream.

In one exemplary embodiment of a system in accordance with aspects of the present invention, a flowmeter 62 may be coupled to provide a signal indicative of the flow rate and/or pressure changes of the compressed air passing therethrough to a controller 64. The flow rate may be mathematically integrated over a period of time to calculate the actual volume of compressed air passing through the flowmeter 62. A memory or look-up table 66 may be used to compare the volume of compressed air actually used relative to a predefined volume for performing the regeneration process, as may be based on the adsorption capacity of the desiccant. Once the volume of compressed air actually used equals or exceeds the predefined volume for performing regeneration, a regeneration signal would be sent by controller 64 to the dryer equipment to perform the regeneration process. That is, in lieu of regenerating at a fixed time interval, one commences the regeneration process using a condition-based regeneration technique, such as may based on the actual utilization of pressurized air, as may be actually utilized by the equipment downstream supplied by the air compressor system.

Figure 3:
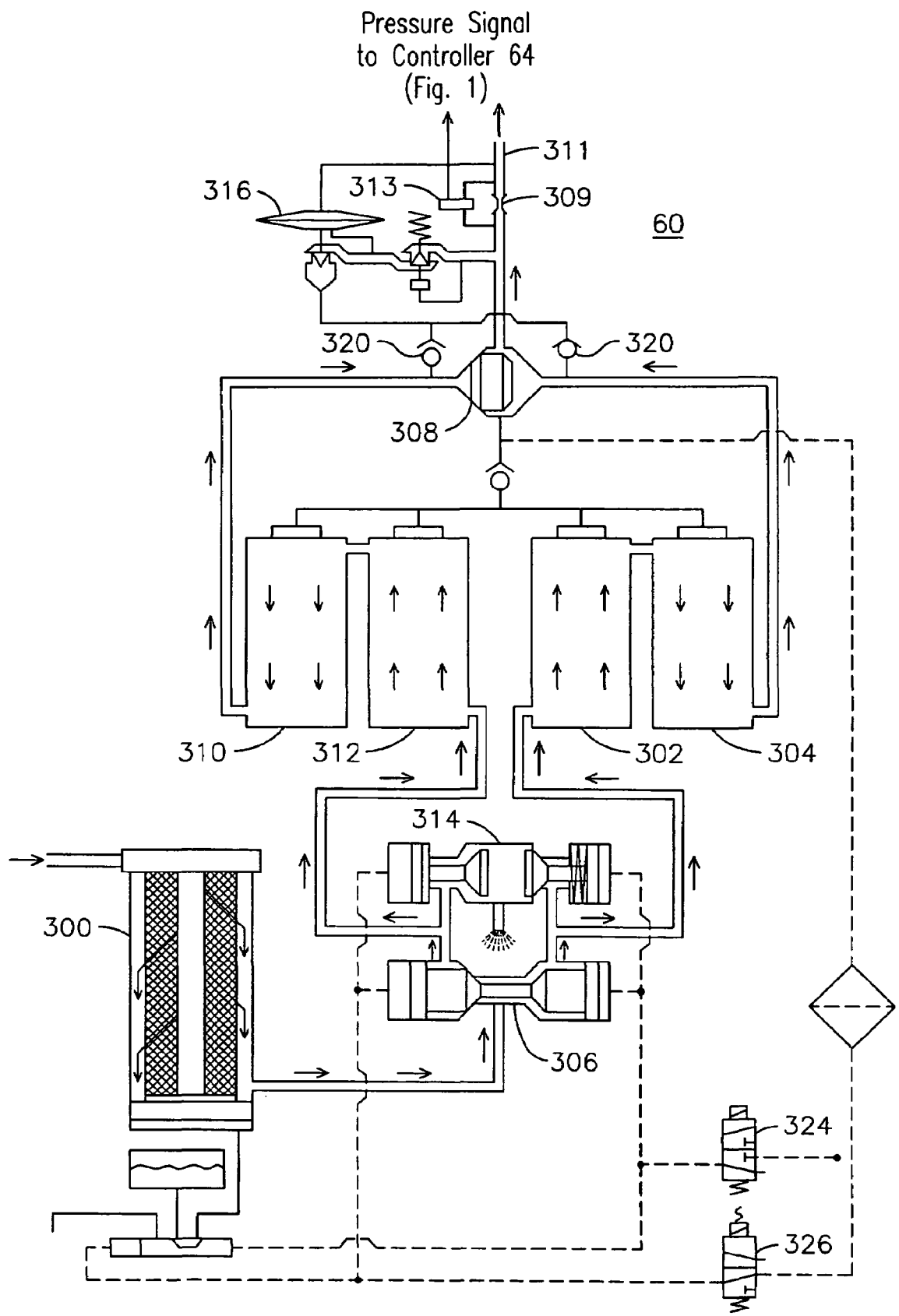
FIG. 3 is a schematic representation of one exemplary embodiment of air dryer equipment, as may be configured for performing a condition-based desiccant regeneration process in lieu of regenerating at a fixed time interval.

FIG. 3 is a schematic representation of one exemplary embodiment of air dryer equipment 60, as may be configured for performing a condition-based desiccant regeneration process in lieu of solely regenerating at a fixed time interval. The description that follows will provide a brief operational overview of air dryer equipment 60. Furthermore, details will be provided of a relatively low-cost and uncomplicated modification to commercially available air-drying equipment that would allow for performing a condition-based regeneration process embodying aspects of the present invention. By way of example, such a modification may be performed to air dryer model 994purveyed by Graham-White Manufacturing Co. It will be understood that in its broad aspects, the present invention is not limited to any particular type of air dryer model and/or manufacturer.

After a coalescer 300 has substantially removed bulk liquids and particulates, e.g., oil particles, from compressed air passing from reservoir 18 (FIG. 1), air that flows from coalescer 300 essentially just includes water vapor. This moist air may be directed though a first set of desiccant-filled towers; let us say desiccant towers 302 and 304, by an inlet diverter valve 306. By way of example, air may flow in a first direction (e.g., upwards) in desiccant tower 302 and then in a second direction (e.g., downwards) in desiccant tower 304. Air from desiccant tower 304 flows through an outlet valve 308 that passes substantially dry, oil-free and clean compressed air. This air passes through a constriction 309 in outlet tube 311 and at least a portion of this air is directed to air-driven equipment (not shown) situated downstream relative to air dryer equipment 60. As air passes through constriction 309, a change in pressure (Venturi effect) develops across such a constriction. The inventor of the present invention has innovatively recognized that the addition of a suitable pressure sensor 313 across constriction 309 provides one alternative embodiment for measuring the airflow rate passing through outlet tube 311. Essentially, this embodiment may be viewed as one practical way for achieving the operational functionality of flowmeter 62 (FIG. 1) without requiring costly and time-consuming equipment redesign. That is, a relatively low-cost and uncomplicated modification can be made to presently existing equipment to provide an airflow rate measurement that may be mathematically integrated by controller 64 to calculate the actual volume of compressed air passing through tube 311.

It will be appreciated that controller 64 need not be a separate controller relative to air dryer equipment 60 since the processing functions for performing a condition-based desiccant regeneration may be programmed into an embedded controller, as may be part of the air dyer equipment 60. Once a condition-based determination is performed relative to the first set of desiccant-filled towers, the inlet diverter valve 306 is actuated to switch the flow of air through a second set of desiccant-filled towers, such as desiccant towers 310 and 312.

Although FIG. 3 illustrates two sets of desiccant towers, wherein each set is made up of two desiccant towers or tanks, it will be appreciated that the present invention is not limited to any specific number of desiccant tanks. Generically, one may use just two desiccant tanks for drying the compressed air. For example the piping and valving may be set for delivering a flow of air to be dried to one tank, e.g., constituting a first tank, and directing a volume of air that has been dried in the first tank to the other tank, e.g., constituting a second tank. One may start regeneration of desiccant in the second tank when the calculated amount of air conditioned by the first tank meets a predefined criteria by reversing the flow of air as between the two tanks. The predefined criteria is based on the amount of air that has been conditioned by the first tank. Once desiccant in the second tank has been reconditioned, a flow of air to be dried is directed to the second tank and a volume of the dried air from the second tank is directed to the first tank to regenerate desiccant in the first tank. The above process of air drying and desiccant regeneration is repeated in alternating fashion switching from one tank to the other tank based on the amount of air that has been conditioned at any given tank, as opposed to performing regeneration based on a fixed time interval that may have little to do with the actual condition of the desiccant.

Desiccant towers undergoing regeneration, let us say desiccant towers 310 and 312, may be isolated relative to compressed air flow by inlet diverter valve 306 and outlet shuttle valve 308. The exhaust valve 314, which is connected to the desiccant towers undergoing regeneration (e.g., desiccant towers 310 and 312), may be opened to reduce to atmosphere the pressure in such desiccant towers. Some amount of dry pressurized air may pass through a self-adjusting purge valve 316. Details regarding the operation of purge valve are well known to those skilled in the art and for the sake of not burdening the reader with minutia for purposes of the present invention such details are omitted from the present description. Suffices to say that self-adjusting purge valve 316 is responsive to the amount of air that passes through outlet tube 311. More specifically, the more air that passes through outlet tube 311, the more air that self-adjusting purge valve 316 passes to the desiccant towers undergoing regeneration.

In one exemplary embodiment, air that passes through purge valve 316 is directed through one of a pair of purge check valves 320 and then through the desiccant towers undergoing regeneration. As dry air flows through the desiccant beads in desiccant towers 310 and 312, this dry air flushes adsorbed water from the desiccant beads therein and discharges such air to atmosphere through open exhaust valve 314. At the end of a regeneration cycle and prior to switching inlet diverter valve 306, exhaust valve 314 is closed and air from self-adjusting purge valve 316 may be used to gradually repressurize the regenerated desiccant towers. Switching of diverter valve 306 and exhaust valve 314 may be performed in response to pressurizing effects caused upon applying regeneration switching signals to solenoid valves 324 and 326 by controller 64. That is, aspects of the present invention are directed to a regeneration control strategy that is based on the actual condition of the desiccant beads, as opposed to a purely timed regeneration control strategy regardless of whether or not the desiccant has reached (or is relatively close) to moisture saturation. It is estimated that when using a condition-based regeneration process during a locomotive idling condition, the period of time for initiating a regeneration cycle may be approximately 30 minutes, as compared to performing regeneration approximately every 2 minutes under the known temporal-based regeneration control strategy. It will be appreciated that this regeneration technique substantially reduces the operational demands on air compressing system 10 (FIG. 1) and is conducive to a relatively longer air compressor life as well as incremental reductions in operational and servicing costs for the compressor.

The inventor of the present invention has further recognized that the flow meter 62 may be used to monitor degradation in the air compressing ability of the air compressor system. For example, the air compressor may be rated to supply a volume of compressed air within a predefined range at a predefined pressure. For example, in one exemplary embodiment, the compressor may be rated to deliver pressurized air in a range from approximately 145 cfm to approximately 180 cfm at a pressure of about 140 psi. As the air compressor ages, the ability to compress air will be gradually diminished, and it is thus desirable to determine whether the air compressor is able to pressurize air within an acceptable range. It is further contemplated that one could, based on past and present air compressing capacity, predict a future point in time when the air-compressing ability of the compressor system may be unacceptable. One may collect data from field-deployed air compressors and/or analytically or empirically derived data to extrapolate in time the present compressing ability of a given compressor to predict the point in time at which the compressing ability of the given compressor may no longer be acceptable so as to perform appropriate maintenance for that given compressor before reaching an unacceptable level of performance. For example, one may collect and store historical data from a plurality of air compressors like the one undergoing inspection to establish reference data for comparing actual data from the compressor undergoing inspection to predict the point in time when that compressor is likely to require a comprehensive servicing action, e.g., compressor overhaul. This data may be collected and stored on a suitable memory device and the data may be downloaded either during a servicing operation at a locomotive service site, or the data may be transmitted by communications equipment onboard the locomotive to a remote diagnostics center. One exemplary sequence for determining air-compressing capacity may be as follows:

Air Compressing Capacity Test:
1. Run air compressor for a predefined amount of time (e.g., 30 minutes) with the compressor motor at a predefined first rpm (e.g., 600 rpm).
2. Hold the pressure at a predefined pressure (e.g., 140 psi).
3. Monitor parameters indicative of reaching a set of predefined operational conditions, an example of such parameters may be lubrication oil temperature and oil pressure.
4. Use the signal from the flowmeter 62 to calculate volume of pressurized air actually supplied by the compressor.
5. Run air compressor for a predefined amount of time (e.g., 10 minutes) with the compressor motor at a second rpm (e.g., 1050 rpm) and repeat steps 2-4 above.

6. Compare actual volume of pressurized air delivered by the compressor relative to a predefined air volume range indicative of whether the capacity of the compressor to deliver pressurized air is acceptable or not.

Figure 2B:
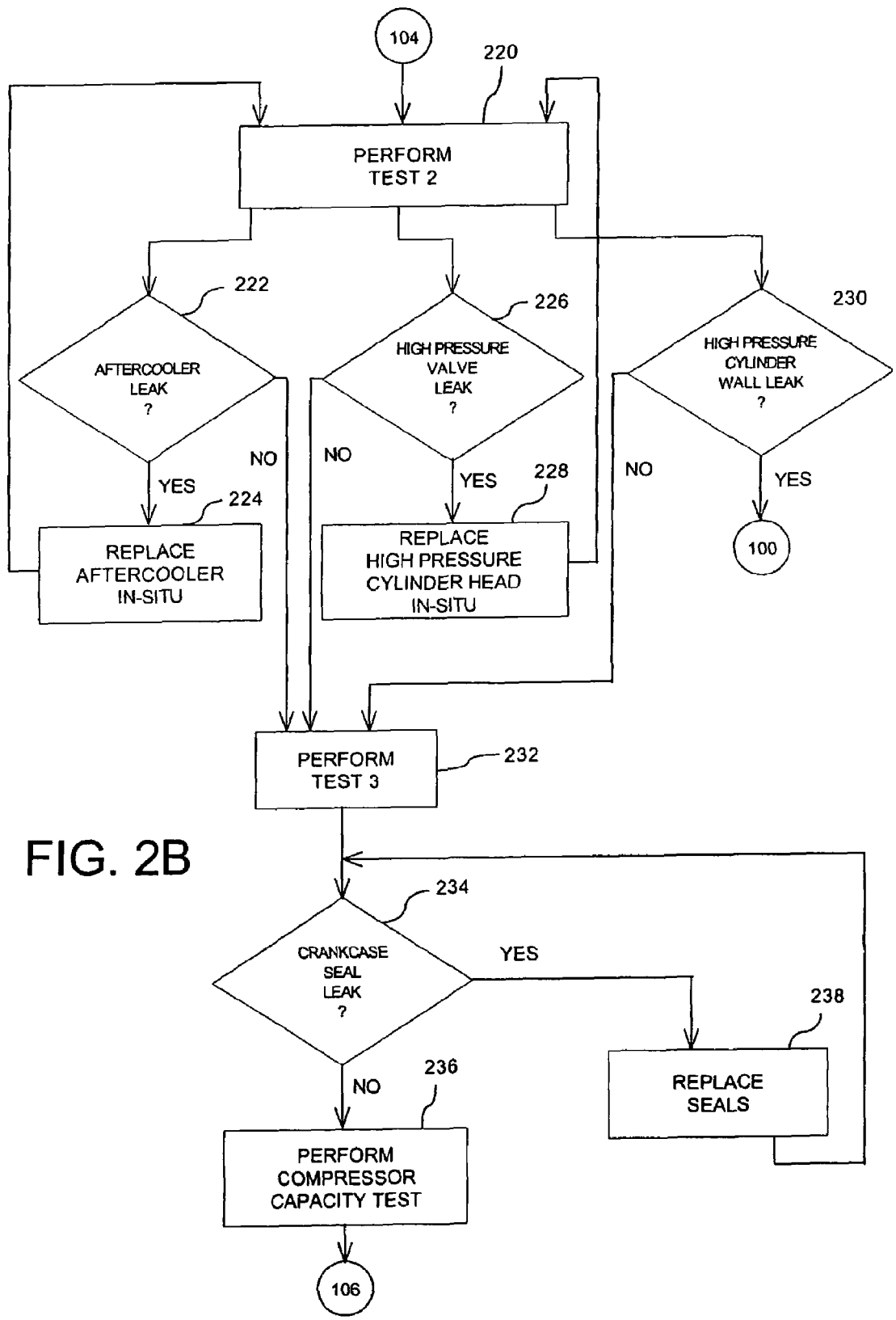
FIG. 2 is made up of FIGS. 2A-2C that collectively depicts a flow chart that illustrates an exemplary sequence of tests that may be performed on the air compressor system of FIG. 1 for identifying malfunctioning components while the system remains onboard the locomotive.
Figure 2C:
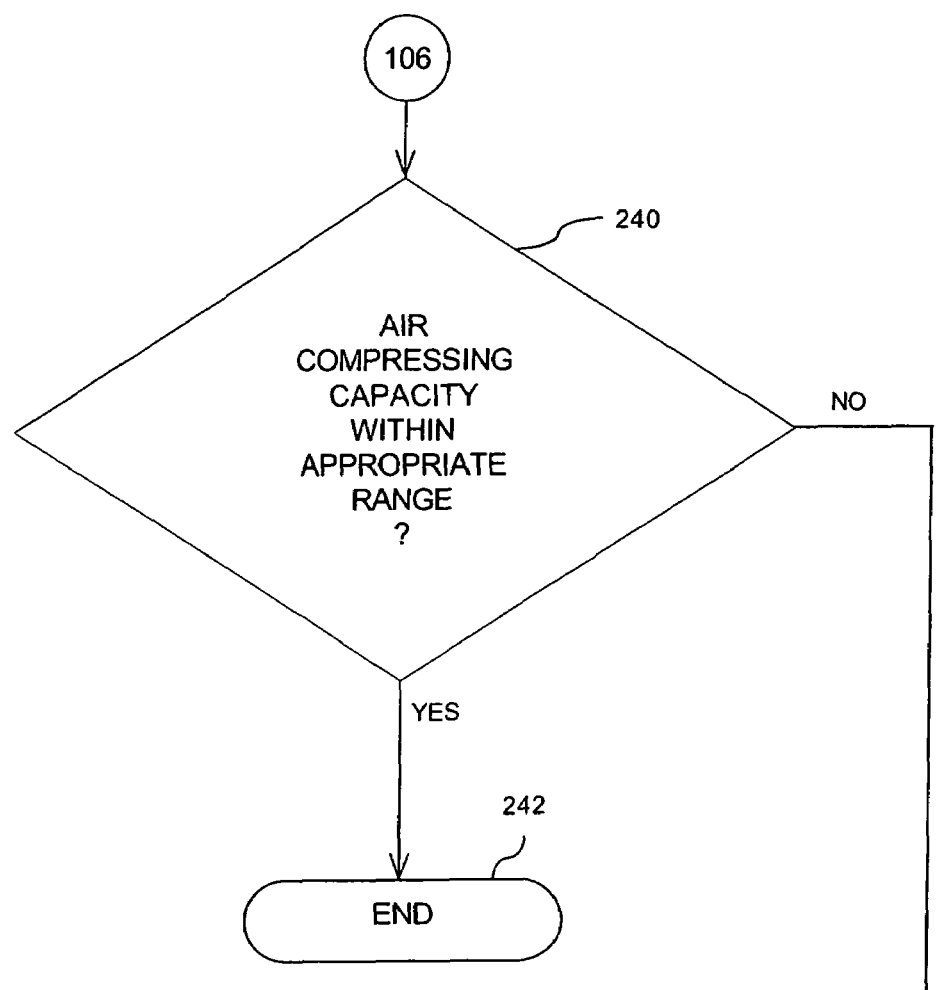
Figure 2C:
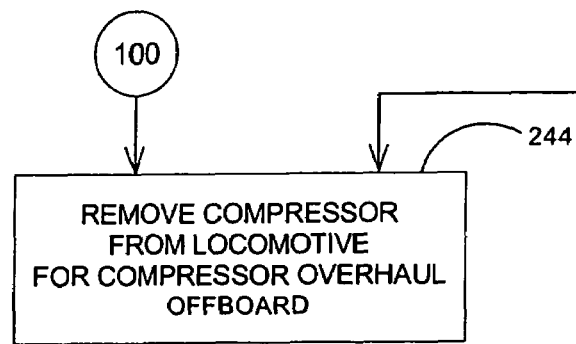

FIG. 2 is a flow chart of a sequence of tests embodying aspects of the present invention for performing diagnostics of an air compressor system on board a locomotive. In one exemplary sequence, as illustrated at block 200, one may initially perform crank case inspection to determine the health of mechanical components within the interior of the crankcase. As shown at decision diamond 202, if the crank case inspection is not passed then, as shown at block 244, the corrective action would be to remove the compressor from the locomotive for compressor overhaul at a specialized service site. If the crank case inspection test is passed one proceeds to block 204 to perform Test 1A, that is pressurizing the intercoolers and one of the two lower pressure cylinders. As shown at decision diamond 206, if an intercooler leak is detected, as shown at block 208, one proceeds to replace the leaking intercooler in-situ. To verify that the intercooler leak has been corrected, one would return to block 204 and repeat Test 1A. As shown at decision diamond 210, another possible failure mode that may be detected while performing Test 1A is detecting a low-pressure cylinder wall leak. If a low-pressure cylinder wall leak is detected, one proceeds through connecting node 100 to block 244 to remove the compressor from the locomotive for compressor overhaul at a specialized service site.

Presuming that no intercooler leak or low pressure cylinder wall leak has been detected, one continues at block 212 to perform Test 1B. That is, pressurizing the intercoolers and the other one of the low-pressure cylinders. As shown at decision diamond 214, if an intercooler leak is detected, as shown at block 216, one proceeds to replace the leaking intercooler in-situ. To verify that the intercooler leak has been corrected, one would return to block 212 and repeat Test 1B. As shown at decision diamond 218, another possible failure mode that may be detected while performing Test 1B is detecting a low-pressure cylinder wall leak. If a low-pressure cylinder wall leak is detected, one proceeds through connecting node 100 to block 244 to remove the compressor from the locomotive for compressor overhaul at a specialized service site. Presuming that no intercooler leak or low-pressure cylinder wall leak has been detected, one continues at block 220 to perform Test 2. That is, aftercooler and high-pressure cylinder test. One of the possible failure modes that may be diagnosed while performing Test 2, as shown at decision diamond 222, is an aftercooler leak. In the event of an aftercooler leak at block 224, one proceeds to replace the aftercooler in-situ. To verify that the aftercooler leak has been corrected, one would return to block 220 and repeat Test 2. As shown at decision diamond 226, another possible failure mode that may be detected while performing Test 2 is a malfunctioning high-pressure valve, e.g., a malfunctioning intake high-pressure valve. If a malfunctioning high-pressure valve is detected, then one proceeds to block 228 to perform a corrective action in-situ, such as replacing the high-pressure cylinder head assembly. To verify that the high-pressure valve malfunction has been corrected one may return to block 220 to restart Test 2. As shown at decision diamond 230, a third possible failure mode that may be detected while performing Test 2 would be to detect a high-pressure cylinder wall leak. If such a high-pressure cylinder wall leak is detected, one proceeds through connecting node 100 to block 244 to remove the compressor from the locomotive for compressor overhaul at the specialized service site.

Once Test 2 has been successfully passed, one proceeds to block 232 to perform Test 3. That is, the crankcase pressurization test. As shown at decision diamond 234, in the event no crankcase seal leak is detected, one then proceeds to block 236 to perform the air compressing capacity test. In the event a crank case seal leak is detected, one proceeds to block 238 to replace the crankcase seals. As shown at decision diamond 240, if the air compressing capacity is determined to be within an appropriate range of volume of pressurized air this would be the end of the test sequence as shown at block 242. If the air compressing capacity is unacceptable, then one proceeds to block 244 to remove the compressor from the locomotive for a compressor overhaul servicing.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A method for controlling desiccant regeneration in air dryer equipment for a railroad locomotive, said method comprising:
    calculating an amount of air conditioned by said air dryer equipment over a period of time;
    storing a predefined criteria for initiating desiccant regeneration in said air dryer equipment;
    correlating the calculated amount of air conditioned by said air dryer equipment relative to said predefined criteria; and
    upon the calculated amount of air conditioned by said air dryer equipment meeting said predefined criteria, initiating desiccant regeneration in said air dryer equipment.

2. The method of claim 1 wherein the calculating of the amount of air conditioned by said air dryer equipment over said period of time comprises measuring air flow rate passing through said air dryer equipment, and mathematically integrating the measured air flow rate to calculate the amount of air conditioned by said air dryer equipment over said period of time.

3. The method of claim 1, with the air dryer equipment having two desiccant tanks for drying compressed air, further comprising delivering a flow of air to be dried to one tank, constituting a first tank, and directing a volume of air that has been dried in the first tank to the other tank, constituting a second tank, for regenerating the desiccant in the second tank.

4. The method of claim 3 wherein said calculating comprises calculating an amount of air conditioned by the first tank over a period of time.

5. The method of claim 4 wherein said storing comprises storing a predefined criteria for initiating desiccant regeneration of the first tank of said air dryer equipment.

6. The method of claim 5 wherein said correlating comprises correlating the calculated amount of air conditioned by said first tank relative to said predefined criteria.

7. The method of claim 6 wherein upon the calculated amount of air conditioned by said first tank meeting said predefined criteria, initiating desiccant regeneration of said first tank by reversing the flow of air as between the tanks, with a flow of air to be dried being directed to the second tank and directing a volume of the dried air from the second tank to the first tank to regenerate desiccant in the first tank.

8. Apparatus for controlling desiccant regeneration in air dryer equipment in a locomotive, said apparatus comprising:

a first processor configured to calculate an amount of air conditioned by said air dryer equipment over a period of time;

memory for storing a predefined criteria based on the amount of air that has been conditioned for initiating desiccant regeneration in said air dryer equipment;

a comparator configured to correlate the calculated amount of air conditioned by said air dryer equipment relative to said predefined criteria; and a second processor for initiating desiccant regeneration in said air dryer equipment when the calculated amount of air conditioned by said air dryer equipment meets said predefined criteria.

9. The apparatus of claim 8 further comprising a flow meter for measuring air flow rate that passes through said air dryer equipment over said period of time.

10. The apparatus of claim 9 wherein said flow meter generates a signal indicative of air flow rate.

11. The apparatus of claim 8 wherein the first and second processors are present in one processing device.

12. The apparatus of claim 11 wherein said processing device is embedded within said air dryer equipment.

13. The apparatus of claim 10 wherein said first processor is configured to mathematically integrate said signal indicative of air flow rate over said period of time, the result of said integration comprising the calculated amount of air conditioned by said air dryer equipment over said period of time.

14. The apparatus of claim 8 wherein said air dryer equipment comprises a tube having a constriction for passing air conditioned by said air dryer equipment, and further wherein a pressure sensor is disposed across said constriction to measure pressure changes across said constriction as airflows by said constriction, said pressure changes indicative of air flow rate that passes through said air dryer equipment over said period of time.

15. The apparatus of claim 14 wherein said first processor is coupled to said pressure sensor to receive a signal indicative of said pressurechanges.

16. The apparatus of claim 10 wherein said first processor is configured to mathematically integrate said measurement of pressure changes over said period of time, the result of said integration comprising the calculated amount of air conditioned by said air dryer equipment over said period of time.

17. The apparatus of claim 14 wherein said first and secondprocessors comprise a processing device external relative to said air dryer equipment.

18. The apparatus of claim 14 wherein said first and secondprocessors comprise a processing device embedded within said air dryer equipment.

19. A system for controlling desiccant regeneration in air dryer equipment for a railroad locomotive, with the air dryer equipment having two desiccant tanks for drying compressed air, with piping and valving delivering a flow of air to be dried to one tank, constituting a first tank, and directing a volume of air that has been dried in the first tank to the other tank, constitutinga second tank, for regenerating the desiccant in the second tank, said system comprising:

a first processor configured to calculate an amount of air conditioned by said first tank over a period of time;

memory for storing a predefined criteria based on the amount of air that has been conditioned for initiating desiccant regeneration in said first tank;

a comparator configured to correlate the calculated amount of air conditioned by said first tank relative to said predefined criteria; and a second processor for initiating desiccant regeneration in said first tank when the calculated amount of air conditioned by said first tank meets said predefined criteria by reversing the flow of air as between the tanks, with a flow of air to be dried being directed to the second tank and directing a volume of the dried air from the second tank to the first tank to regeneratedesiccant in the first tank.

20. The apparatus of claim 19 wherein the first and second processors comprise the same processing device.

21. A computer-readable storage medium containing computer-readable program code to program a processor for controlling desiccant regeneration in air dryer equipment for a railroad locomotive, the computer-readable program code in said computer-readable storage medium comprising:

computer-readable program code for calculating with the processor an amount of air conditioned by said air dryer equipment over a period of time;

computer-readable program code for defining in a memory coupled to the processor a predefined criteria for initiating desiccant regeneration in said air dryer equipment;

computer-readable program code for correlating in the processor the calculated amount of air conditioned by said air dryer equipment relative to said predefined criteria; and computer readable program code for initiating in response to a command from the processor desiccant regeneration in said air dryer equipment once the calculated amount of air conditioned by said air dryer equipment meeting said predefined criteria.

* * * * *